(12) United States Patent
Chen et al.

(10) Patent No.: US 11,929,915 B2
(45) Date of Patent: Mar. 12, 2024

(54) PATH CALCULATION METHOD, APPARATUS, AND DEVICE

(71) Applicant: Huawei Technologies Co., Ltd., Shenzhen (CN)

(72) Inventors: Chuang Chen, Beijing (CN); Zhibo Hu, Beijing (CN); Jie Dong, Beijing (CN); Junda Yao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 17/401,101

(22) Filed: Aug. 12, 2021

(65) Prior Publication Data

US 2021/0377155 A1 Dec. 2, 2021

Related U.S. Application Data

(63) Continuation of application No. PCT/CN2020/074725, filed on Feb. 11, 2020.

(30) Foreign Application Priority Data

Feb. 13, 2019 (CN) .......................... 201910115359.6

(51) Int. Cl.
*G06F 15/16* (2006.01)
*H04L 45/02* (2022.01)
(Continued)

(52) U.S. Cl.
CPC .............. *H04L 45/16* (2013.01); *H04L 45/02* (2013.01); *H04L 45/124* (2013.01); *H04L 45/127* (2013.01)

(58) Field of Classification Search
CPC ..... H04L 45/16; H04L 45/124; H04L 45/127; H04L 45/50
See application file for complete search history.

(56) References Cited

U.S. PATENT DOCUMENTS 7,801,048 B1 9/2010 Sivabalan et al.
10,044,600 B2 8/2018 Zhang et al.
(Continued)

FOREIGN PATENT DOCUMENTS

CN 101072238 A 11/2007
CN 102209029 A 10/2011
(Continued)

OTHER PUBLICATIONS

Psenak et al., IGP Flexible Algorithm draft-ietf-lsr-flex-algo-01.txt, Nov. 12, 2018, 23 pages. (Year: 2018).*
(Continued)

*Primary Examiner* — Hieu T Hoang
(74) *Attorney, Agent, or Firm* — Slater Matsil, LLP

(57) ABSTRACT

A path calculation method, apparatus, and device, to implement network slicing. The path calculation method includes: obtaining an algorithm constraint supported by each of a plurality of network devices, where the algorithm constraint is a constraint of a forwarding path algorithm, and the forwarding path algorithm is used to calculate, for the network device, a forwarding path that meets the algorithm constraint; performing network topology division on the plurality of network devices, where network devices in a same network topology support a same algorithm constraint; and calculating a forwarding path between network devices in each network topology based on the algorithm constraint, of the forwarding path algorithm, corresponding to the network topology.

17 Claims, 7 Drawing Sheets

(51) Int. Cl.
*H04L 45/12* (2022.01)
*H04L 45/16* (2022.01)

(56) References Cited

U.S. PATENT DOCUMENTS

| | | | | |
|---|---|---|---|---|
| 10,110,479 | B1* | 10/2018 | Ramachandran | H04L 45/586 |
| 10,601,724 | B1* | 3/2020 | Filsfils | H04L 47/70 |
| 10,637,768 | B1* | 4/2020 | Joseph | H04L 45/02 |
| 10,812,372 | B2 | 10/2020 | Long | |
| 2004/0246896 | A1 | 12/2004 | Hoang et al. | |
| 2007/0217419 | A1* | 9/2007 | Vasseur | H04L 45/24 370/392 |
| 2013/0028094 | A1* | 1/2013 | Gao | H04L 47/724 370/400 |
| 2015/0103844 | A1* | 4/2015 | Zhao | H04L 45/42 370/410 |
| 2015/0319086 | A1 | 11/2015 | Tripathi et al. | |
| 2015/0381406 | A1* | 12/2015 | Francois | H04L 45/28 370/218 |
| 2016/0366051 | A1* | 12/2016 | Chen | H04L 45/02 |
| 2019/0149450 | A1* | 5/2019 | Long | H04L 45/124 370/422 |
| 2021/0083940 | A1* | 3/2021 | Peng | H04W 36/00 |
| 2022/0014394 | A1* | 1/2022 | Zhao | H04L 12/4633 |
| 2022/0052945 | A1* | 2/2022 | Peng | H04W 40/02 |
| 2023/0032778 | A1* | 2/2023 | Peng | H04L 41/0806 |

FOREIGN PATENT DOCUMENTS

| | | |
|---|---|---|
| CN | 103415056 A | 11/2013 |
| CN | 104092609 A | 10/2014 |
| CN | 104702502 A | 6/2015 |
| CN | 106209623 A | 12/2016 |
| CN | 107517155 A | 12/2017 |
| CN | 107517157 A | 12/2017 |
| CN | 108075980 A | 5/2018 |
| CN | 108495358 A | 9/2018 |
| CN | 108632062 A | 10/2018 |
| CN | 109218201 A | 1/2019 |
| CN | 109831382 B | 8/2020 |
| EP | 3544245 A1 | 9/2019 |
| WO | 2018174021 A1 | 9/2018 |

OTHER PUBLICATIONS

Ginsberg, L. et al., "Advertising L2 Bundle Member Link Attributes in IS-IS draft-ietf-isis-l2bundles-07.txt", Networking Working Group, May 25, 2017, 18 pages.

Psenak, P. et al., "IGP Flexible Algorithm; draft-ietf-lsr-flex-algo-01.txt", Network Working Group, Nov. 12, 2018, 23 pages.

Previdi, S. et al., "IS-IS Traffic Engineering (TE) Metric Extensions", Internet Engineering Task Force (IETF), RFC 7810, May 2016, 18 pages.

Li, T. et al., "IS-IS Extensions for Traffic Engineering", Network Working Group, RFC 5305, Oct. 2008, 17 pages.

* cited by examiner

PATH CALCULATION METHOD, APPARATUS, AND DEVICE

CROSS-REFERENCE TO RELATED APPLICATIONS

This application is a continuation of International Application No. PCT/CN2020/074725, filed on Feb. 11, 2020, which claims priority to Chinese Patent Application No. 201910115359.6, filed on Feb. 13, 2019. The disclosures of the aforementioned applications are hereby incorporated by reference in their entireties.

TECHNICAL FIELD

This application relates to the field of network communications, and in particular, to a path calculation method, apparatus, and device.

BACKGROUND

To isolate resources between different types of services and allow resources to be shared and reused among services of a same type to resolve a problem of traffic congestion, the network slicing technology appears. The network slicing technology can implement logically isolated network partition (LINP). One network slice means that, in one physical network, related network resources are integrated together to form a complete, autonomous, and independent operation and management logical network, to meet specific user and service requirements. Different network slices may implement different service requirements. For example, one network slice provides a video service, one network slice provides a machine to machine (M2M) service, and another network slice provides an ultra-low delay (<1 millisecond) self-driving service.

Although a concept of the network slicing has been put forward for a period of time, how to implement the network slicing is still in an exploration phase.

SUMMARY

Embodiments of this application provide a path calculation method, apparatus, and related device, to implement network slicing.

According to a first aspect, an embodiment of this application provides a path calculation method, and the method may be performed by a controller or an ingress node. The controller may be a software defined networking (SDN) controller, or the like. The ingress node is a network device that receives a packet or generates a packet, for example, a switch or a router. Specifically, the method includes the following steps. First, an algorithm constraint supported by each of a plurality of network devices is obtained. The algorithm constraint is a constraint of a forwarding path algorithm, and the forwarding path algorithm is used to calculate, for the network device, a forwarding path that meets the algorithm constraint. The forwarding path algorithm may be, for example, a flexible algorithm (FA), and an algorithm constraint of the flexible algorithm includes, for example, a metric type, a calculation type, and a link attribute. Optionally, at least one of the plurality of network devices supports at least two algorithm constraints. Then, network topology division is performed on the plurality of network devices, where network devices in a same network topology support a same algorithm constraint. One network topology is used to implement a function of one network slice. When one network topology is obtained after the network topology division is performed on the plurality of network devices, a function of one network slice may be implemented. If a plurality of network topologies are obtained after the network topology division is performed on the plurality of network devices, functions of a plurality of network slices may be implemented. When a specific network device supports at least two algorithm constraints, it indicates that the network device belongs to at least two network topologies. After the network topology division is performed, a forwarding path between network devices in each network topology is calculated based on the algorithm constraint, of the forwarding path algorithm, corresponding to the network topology, and the forwarding path is used to indicate the network device to forward a packet. Optionally, the forwarding path may be a path with a minimum link cost, or may be referred to as a shortest forwarding path. In this embodiment of this application, the algorithm constraint supported by each of the plurality of network devices is obtained, and the network topology division is performed on the plurality of network devices based on the algorithm constraint supported by each of the plurality of network devices, so that network devices in the same network topology support the same algorithm constraint. In other words, one network topology implements a function of one network slice. Finally, the forwarding path between the network devices in each network topology is calculated based on the algorithm constraint, of the forwarding path algorithm, corresponding to the network topology, and the forwarding path is used to indicate the network device to forward the packet, to implement network slicing.

It may be understood that one network device may have one or more main interfaces, and the main interface is configured to forward the packet. Optionally, if one network device supports a plurality of different network topologies, and a specific main interface of the network device is corresponding to a plurality of forwarding paths, the main interface may include a plurality of sub-interfaces, and the sub-interface may be a physical interface or a logical interface. Specifically, the path calculation method further includes the following step. First, at least one main interface of each of the at least one network device is obtained. Then, a plurality of pieces of sub-interface information is matched for each of the at least one main interface of the network device, where each of the at least one main interface is corresponding to a plurality of sub-interfaces, and each of the plurality of sub-interfaces is corresponding to one piece of the sub-interface information. The main interface may be a Layer 3 interface in the intermediate system to intermediate system (ISIS) protocol, and the sub-interface may be a Layer 2 interface. Then, a first mapping relationship is established for each of the plurality of sub-interfaces, where the first mapping relationship is a mapping relationship between the sub-interface information of the sub-interface and an algorithm constraint supported by a corresponding network device. In other words, each of the at least one main interface is corresponding to a plurality of first mapping relationships. Finally, the first mapping relationship corresponding to each sub-interface is sent to the plurality of network devices, where the first mapping relationship is used by the corresponding network device to forward a packet. In this embodiment of this application, different sub-interfaces of a same main interface are configured to forward packets for forwarding paths corresponding to different algorithm constraints. For example, a main interface A includes a sub-interface A' and a sub-interface A". The sub-interface A' supports an algorithm constraint 1 and implements a function of a network slice 1. The sub-interface A" supports an algorithm constraint 2 and implements a function of a network slice 2. In this case, the sub-interface A' is configured to forward a packet that is corresponding to a forwarding path 1 obtained based on the algorithm constraint 1, and the sub-interface A" is configured to forward a packet that is corresponding to a forwarding path 2 obtained based on the algorithm constraint 2. The first mapping relationship corresponding to each sub-interface of the network device is delivered to the network device, to implement different network slicing functions by using a same network device.

Optionally, to enable the network device to know a correspondence between the main interface and the sub-interface, the method further includes: obtaining main interface information corresponding to each of the at least one main interface of the network device, and sending a second mapping relationship to the network device, where the second mapping relationship is a mapping relationship between the main interface information of the main interface and the corresponding plurality of pieces of sub-interface information. In this embodiment of this application, the main interface information is information used to identify the main interface, for example, an interface number or an interface index of the main interface. The sub-interface information is information used to identify the sub-interface, for example, an interface number or an interface index of the sub-interface.

Optionally, the calculating a forwarding path between network devices in each network topology based on an algorithm constraint of the forwarding path algorithm corresponding to the network includes the following steps. First, a request message for establishing a packet path is received, where the request message may be from an ingress node. The request message includes a flow identifier of the packet. The flow identifier is an identifier that has an indication function on a flow, for example, a source address or a destination address of the packet, or a label that identifies a service to which the packet belongs. Then, a network topology for forwarding the packet is determined based on the flow identifier, and a forwarding path for forwarding the packet is calculated in the network topology.

Correspondingly, the path calculation method further includes: generating a label stack corresponding to the forwarding path, where the label stack includes an adjacency segment identifier (adj SID) and/or a node segment identifier (node SID) of a network device on the forwarding path; and sending the label stack to the ingress node. In this embodiment of this application, the adjacency segment identifier and/or the node segment identifier of the network device may be corresponding to the main interface or the sub-interface of the network device. In this way, after receiving the packet, the ingress node may push the label stack into the packet, so that the network device in the forwarding path forwards the packet based on a main interface or a sub-interface corresponding to the adjacency segment identifier and/or the node segment identifier in the label stack.

Optionally, the algorithm constraint includes an identifier of the forwarding path algorithm and/or a link attribute included in the forwarding path algorithm.

According to a second aspect, an embodiment of this application further provides a path calculation method. The method is applied to a first network device, and the first network device may be a device such as a router or a switch. The path calculation method specifically includes the following steps. First, an algorithm constraint supported by the first network device is obtained. The algorithm constraint is a constraint of a forwarding path algorithm, and the forwarding path algorithm is used to calculate, for the first network device, a forwarding path that meets the algorithm constraint. The forwarding path algorithm may be, for example, a flexible algorithm (FA), and an algorithm constraint of the flexible algorithm includes, for example, a metric type, a calculation type, and a link attribute. In actual application, the first network device may obtain the algorithm constraint of the first network device in a manner of delivery by the controller, or may obtain the algorithm constraint of the first network device in a manner of configuration, or the like. This is not specifically limited in this application. Then, a second network device whose algorithm constraint is the same as the algorithm constraint of the first network device is determined, and that the first network device and the second network device that support the same algorithm constraint are in one network topology is determined. The first network device may support one or more algorithm constraints. If the first network device supports a plurality of algorithm constraints, a corresponding second network device may be determined for each of the plurality of algorithm constraints supported by the first network device, to form a plurality of network topologies. Finally, a forwarding path from the first network device to the second network device in the network topology is calculated based on an algorithm constraint corresponding to the network topology. In this embodiment of this application, one network topology is used to implement a function of one network slice. The algorithm constraint supported by the first network device is obtained, that the first network device and the second network device that support the same algorithm constraint are in one network topology is determined, and the forwarding path from the first network device to the second network device in the network topology is calculated based on the algorithm constraint corresponding to the network topology. The forwarding path is used to indicate the packet to be forwarded from the first network device to the second network device corresponding to the network topology, to implement network slicing.

Optionally, the method further includes the following steps. First, a corresponding label forwarding table is generated for the first network device, where the label forwarding table includes a label and main interface information. The main interface information is information about an interface connecting the first network device to a next-hop network device on the forwarding path. Then, a packet is obtained, and the packet may be from another network device, or may be generated by the first network device itself. Next, a corresponding label is determined based on the packet, and the label forwarding table is searched based on the label, to obtain main interface information corresponding to the packet. Finally, the packet is forwarded based on a main interface corresponding to the main interface information corresponding to the packet. Specifically, if the packet obtained by the network device is a packet received by the network device from another network device, and the packet is an internet protocol (IP) packet, a corresponding incoming label may be determined based on a flow identifier carried in the packet, and then a corresponding label forwarding table is found based on the corresponding incoming label. The flow identifier is an identifier that has an indication function on a flow, for example, a source address or a destination address of the packet, or a label that identifies a service to which the packet belongs. If the packet received by the network device is a multi-protocol label switching (MPLS) packet, a topmost label in a label stack in a header of the packet is used as an incoming label, and then a label forwarding table corresponding to the incoming label is searched.

Optionally, if one network device supports a plurality of different network topologies, and a specific main interface of the network device is corresponding to a plurality of forwarding paths, a plurality of pieces of sub-interface information corresponding to the main interface may be obtained, and a corresponding label forwarding table is separately generated for the different forwarding paths based on the plurality of pieces of sub-interface information. In this way, a packet can be separately forwarded for different network topologies based on different label forwarding tables. Therefore, the label forwarding table further includes an algorithm constraint corresponding to the forwarding path, and one main interface includes at least one sub-interface. The method further includes: generating a mapping relationship table, where the mapping relationship table includes main interface information, the algorithm constraint, and sub-interface information corresponding to the forwarding path, and the sub-interface information is information about a sub-interface included in the main interface corresponding to the main interface information. Correspondingly, the searching the label forwarding table based on the label, to obtain main interface information corresponding to the packet includes: searching the label forwarding table based on the label, to obtain the main interface information corresponding to the packet and an algorithm constraint. The forwarding the packet based on a main interface corresponding to the main interface information corresponding to the packet includes: searching the mapping relationship table based on the main interface information corresponding to the packet and the algorithm constraint, to obtain corresponding sub-interface information; and forwarding the packet based on a sub-interface corresponding to the sub-interface information obtained by searching.

Optionally, the label includes an incoming label and an outgoing label. The determining a corresponding label based on the packet, and searching the label forwarding table based on the label, to obtain main interface information corresponding to the packet includes: determining a corresponding incoming label based on the packet, and searching the label forwarding table based on the incoming label, to obtain main interface information corresponding to the packet and an outgoing label corresponding to the packet; and before the forwarding the packet based on a main interface corresponding to the main interface information corresponding to the packet, the method further includes: encapsulating the outgoing label corresponding to the packet into the packet.

Optionally, the algorithm constraint includes an identifier of the forwarding path algorithm and/or a link attribute included in the forwarding path algorithm.

According to a third aspect, an embodiment of this application further provides a path calculation apparatus. The apparatus includes: a first obtaining unit, configured to obtain an algorithm constraint supported by each of a plurality of network devices, where the algorithm constraint is a constraint of a forwarding path algorithm, and the forwarding path algorithm is used to calculate, for the network device, a forwarding path that meets the algorithm constraint; a division unit, configured to perform network topology division on the plurality of network devices, where network devices in a same network topology support a same algorithm constraint; and a calculation unit, configured to calculate a forwarding path between network devices in each network topology based on the algorithm constraint, of the forwarding path algorithm, corresponding to the network topology.

Optionally, the apparatus further includes: a second obtaining unit, configured to obtain at least one main interface of each of the plurality of network devices; a matching unit, configured to match a plurality of pieces of sub-interface information for each of the at least one main interface of the network device, where each of the at least one main interface is corresponding to a plurality of sub-interfaces, and each of the plurality of sub-interfaces is corresponding to one piece of the sub-interface information; an establishment unit, configured to establish a first mapping relationship for each of the plurality of sub-interfaces, where the first mapping relationship is a mapping relationship between the sub-interface information of the sub-interface and an algorithm constraint supported by a corresponding network device; and a first sending unit, configured to send, to the plurality of network devices, the first mapping relationship corresponding to each sub-interface, where the first mapping relationship is used by the corresponding network device to forward a packet.

Optionally, the apparatus further includes: a third obtaining unit, configured to obtain main interface information corresponding to each of the at least one main interface of the network device, and send a second mapping relationship to the network device, where the second mapping relationship is a mapping relationship between the main interface information of the main interface and the corresponding plurality of pieces of sub-interface information.

Optionally, the calculation unit is configured to receive a request message for establishing a packet path, where the request message includes a flow identifier of a packet; and determine, based on the flow identifier, a network topology for forwarding the packet, and calculate, in the network topology, a forwarding path for forwarding the packet.

The apparatus further includes: a generation unit, configured to generate a label stack corresponding to the forwarding path, where the label stack includes an adjacency segment identifier and/or a node segment identifier of a network device on the forwarding path; and a second sending unit, configured to send the label stack to the ingress node of the forwarding path.

Optionally, the algorithm constraint includes an identifier of the forwarding path algorithm and/or a link attribute included in the forwarding path algorithm.

According to a fourth aspect, an embodiment of this application further provides a path calculation apparatus. The apparatus is applied to a first network device, and the apparatus includes: a condition obtaining unit, configured to obtain an algorithm constraint supported by the first network device, where the algorithm constraint is a constraint of a forwarding path algorithm, and the forwarding path algorithm is used to calculate, for the first network device, a forwarding path that meets the algorithm constraint; a determining unit, configured to determine a second network device whose algorithm constraint is the same as the algorithm constraint of the first network device, and determine that the first network device and the second network device that support the same algorithm constraint are in one network topology; and a calculation unit, configured to calculate a forwarding path from the first network device to the second network device in the network topology based on an algorithm constraint corresponding to the network topology.

Optionally, the apparatus further includes: a first generating unit, configured to generate a corresponding label forwarding table for the first network device, where the label forwarding table includes a label and main interface information, and the main interface information is information about an interface connecting the first network device to a next-hop network device on the forwarding path; a packet obtaining unit, configured to obtain a packet, determine a corresponding label based on the packet, and search the label forwarding table based on the label, to obtain main interface information corresponding to the packet; and a forwarding unit, configured to forward the packet based on a main interface corresponding to the main interface information corresponding to the packet.

Optionally, the label forwarding table further includes an algorithm constraint corresponding to the forwarding path, one main interface includes at least one sub-interface, and the apparatus further includes: a second generating unit, configured to: generate a mapping relationship table, where the mapping relationship table includes main interface information, the algorithm constraint, and sub-interface information corresponding to the forwarding path, and the sub-interface information is information about a sub-interface included in the main interface corresponding to the main interface information. The searching the label forwarding table based on the label, to obtain main interface information corresponding to the packet includes: searching the label forwarding table based on the label, to obtain the main interface information corresponding to the packet and an algorithm constraint. The forwarding the packet based on a main interface corresponding to the main interface information corresponding to the packet includes: searching the mapping relationship table based on the main interface information corresponding to the packet and the algorithm constraint, to obtain corresponding sub-interface information, and forward the packet based on a sub-interface corresponding to the sub-interface information obtained by searching.

Optionally, the label includes an incoming label and an outgoing label. The determining a corresponding label based on the packet, and searching the label forwarding table based on the label, to obtain main interface information corresponding to the packet includes: determining a corresponding incoming label based on the packet, and searching the label forwarding table based on the incoming label, to obtain main interface information corresponding to the packet and an outgoing label corresponding to the packet. Before the forwarding the packet based on a main interface corresponding to the main interface information corresponding to the packet, the apparatus further includes: encapsulating the outgoing label corresponding to the packet into the packet.

Optionally, the algorithm constraint includes an identifier of the forwarding path algorithm and/or a link attribute included in the forwarding path algorithm.

According to a fifth aspect, an embodiment of this application further provides a path calculation device. The device includes a memory, a processor, and a communications interface.

The memory is configured to store an instruction.

The processor is configured to execute the instruction in the memory, to execute the foregoing path calculation method.

The communications interface is configured to communicate with a plurality of network devices.

According to a sixth aspect, an embodiment of this application further provides a computer-readable storage medium, including an instruction. When the instruction is run on a computer, the computer is enabled to perform the foregoing path calculation method.

DETAILED DESCRIPTION OF ILLUSTRATIVE EMBODIMENTS

An embodiment of this application provides a path calculation system. The system is configured to construct, based on a different constraint of a forwarding path algorithm, a network topology that supports a different service. The network topology may also be referred to as a network slice.

Figure 1:
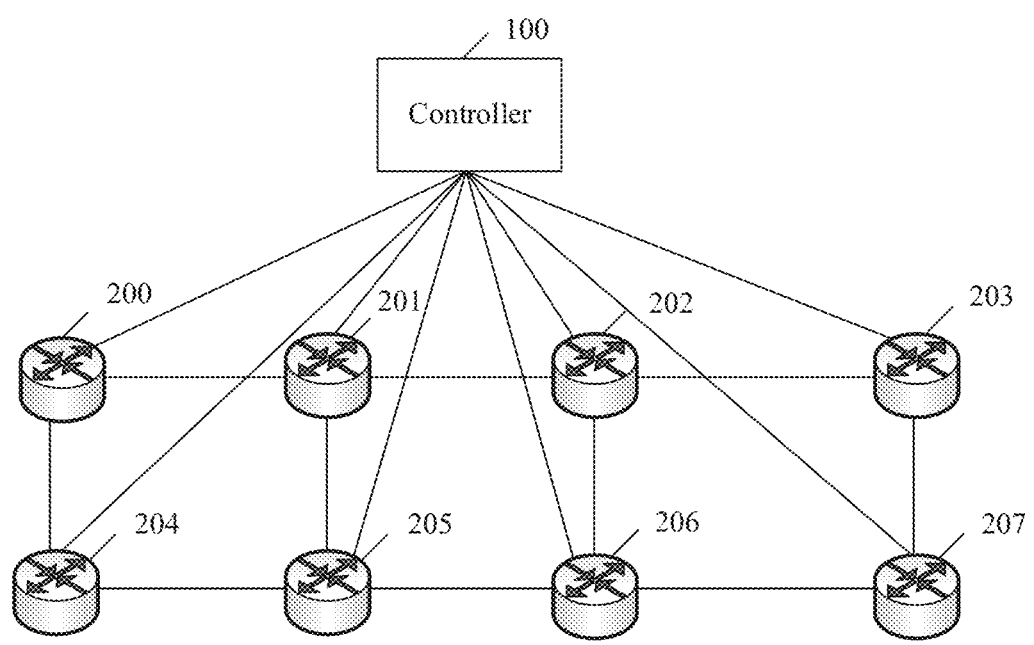
FIG. 1 is a schematic structural diagram of a path calculation system according to an embodiment of this application.

The following uses an application scenario as an example to describe the path calculation system provided in this embodiment of this application. FIG. 1 is a schematic diagram of a path calculation system according to an embodiment of this application.

The path calculation system shown in FIG. 1 includes a controller wo and network devices 200 to 207. The network device 200 is separately connected to the network device 201 and the network device 204, the network device 201 is separately connected to the network device 202 and the network device 205, the network device 202 is separately connected to the network device 203 and the network device 206, the network device 204 is connected to the network device 205, the network device 205 is connected to the network device 206, and the network device 206 is connected to the network device 207. The controller wo is separately connected to the network device 200, the network device 201, the network device 202, the network device 203, the network device 204, the network device 205, the network device 206, and the network device 207.

The network device 200, the network device 201, the network device 202, the network device 203, the network device 204, the network device 205, the network device 206, and the network device 207 each may be a device such as a router and a switch, and are configured to forward a packet. The controller wo may be a software defined networking (SDN) controller or the like, and is configured to control the foregoing network device connected to the controller 100.

In this embodiment of this application, network topology division may be performed on a plurality of network devices. Network devices in a same network topology may support a same algorithm constraint of a forwarding path algorithm, and different network topologies are corresponding to different algorithm constraints, to support different services. For example, services that need to be supported by a network include a high-bandwidth service and a low-delay service, a network slice 1 supports the high-bandwidth service, and a network slice 2 supports the low-delay service. The high-bandwidth service is a service that has a relatively high requirement on a network bandwidth and rate, for example, a 4K/8K ultra high-definition video service. The low-delay service such as self-driving or an internet of vehicles requires ultra-low delay and high reliability.

The forwarding path algorithm may be, for example, a flexible algorithm. For the algorithm, a group of algorithm constraints may be defined as required, and a forwarding path that meets the algorithm constraint is generated based on the algorithm constraint. In this embodiment of this application, a characteristic that an FA algorithm constraint can be flexibly defined may be used to define different algorithm constraints for different network slices. Network devices that meet the different algorithm constraints may form different network topologies, and a forwarding path is calculated based on the different network topology.

In actual application, each network device connected to the controller wo may calculate the forwarding path, or the controller wo may calculate the forwarding path. For example, if a segment routing (SR) network applied in a path calculation system implements traffic engineering (TE), the controller wo calculates the forwarding path. If an SR network applied in a path calculation system implements a best effort (BE) forwarding manner, the network device calculates the forwarding path.

The following separately uses two scenarios in which the network device connected to the controller wo calculates the forwarding path and the controller wo calculates the forwarding path as examples to describe the technical solutions provided in the embodiments of this application.

Application scenario 1: Each network device connected to the controller 100 calculates the forwarding path.

Figure 2:
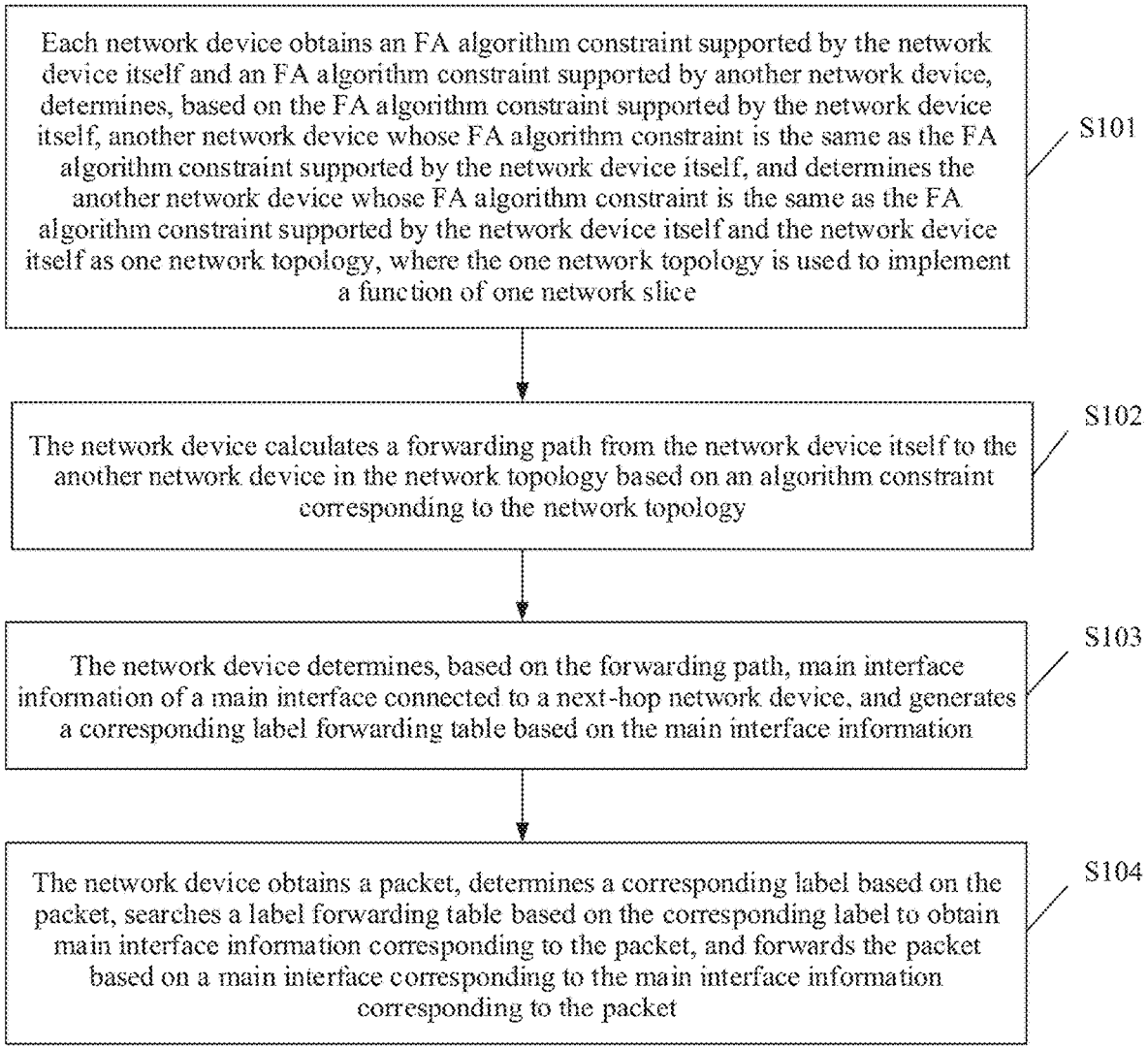
FIG. 2 is a flowchart of a path calculation method according to an embodiment of this application.

FIG. 2 is a flowchart of a path calculation method according to an embodiment of this application.

S101: Each network device obtains an FA algorithm constraint supported by the network device itself and an FA algorithm constraint supported by another network device, determines, based on the FA algorithm constraint supported by the network device itself, another network device whose algorithm constraint is the same as the algorithm constraint supported by the network device itself, and determines the another network device whose algorithm constraint is the same as the algorithm constraint supported by the network device itself and the network device itself as one network topology, where the one network topology is used to implement a function of one network slice.

Optionally, the controller 100 may create an FA algorithm constraint corresponding to the network slice 1 and an FA algorithm constraint corresponding to the network slice 2, and deliver the two FA algorithm constraints to the network device connected to the controller 100.

The FA algorithm constraint may include: a metric type, a calculation type, and a link attribute.

The metric type includes three types: metric type=0 represents an interior gateway protocol (IGP) metric value; metric type=1 represents a minimum unidirectional link delay, and for details, refer to RFC7810; and metric type=2 represents a traffic engineering metric value, and for details, refer to RFC5305.

There are two calculation types: calculation type=0 represents shortest path first (SPF), and calculation type=1 represents strict shortest path first (strict SPF).

The link attribute is represented by a color. Different link attributes are corresponding to different colors. Network devices with a same link attribute form one network topology structure, and a corresponding forwarding path is calculated based on the network topology structure.

In addition, each algorithm constraint is corresponding to one FA identifier (ID). Different FA IDs are corresponding to different algorithm constraints. In this embodiment of this application, the FA ID may be considered as a key index of the algorithm constraint, and different algorithm constraints are corresponding to different FA IDs.

The FA algorithm constraint corresponding to the network slice 1, namely, the high-bandwidth service, is as follows:
FA ID: 128;
metric type: IGP Metric;
calculation type: SPF; and
link attribute: red.

The FA algorithm constraint corresponding to the network slice 2, namely, the low-delay service, is as follows:
FA ID: 129;
metric type: IGP Metric;
calculation type: SPF; and
link attribute: blue.

After creating the FA algorithm constraint corresponding to the network slice 1 and the FA algorithm constraint corresponding to the network slice 2, the controller 100 may send the two FA algorithm constraints respectively to corresponding network devices, so that the network device 200 to the network device 207 each can obtain an FA algorithm constraint supported by the network device itself. Then, the network device 200 to the network device 207 each may obtain, in an intra-domain flooding manner, an FA algorithm constraint supported by a network device other than the network device itself.

Specifically, the controller wo may send an intermediate system to intermediate system (ISIS) packet to the network device 200 to the network device 207. The packet includes a flex-algorithm field, a metric type field, a calculation type field, and a type-length-value (TLV) field. In this embodiment of this application, the TLV field may be an extended administration group (extended admin group) field.

A value of the flex-algorithm field may be an FA ID, a value of the metric type field may be a corresponding metric type, a value of the calculation type field may be a corresponding calculation type, and a value of the TLV field may be a link attribute.

It may be understood that in actual application, the network device may not obtain, by using the controller wo, the algorithm constraint supported by the network device, but may obtain the algorithm constraint in another manner, for example, in a manner of direct configuration in the network device. This is not specifically limited in this application.

After obtaining the algorithm constraint supported by the network device, the network device may determine, based on the FA algorithm constraint supported by the network device itself, the another network device whose algorithm constraint is the same as the algorithm constraint supported by the network device itself, and determines the another network device whose algorithm constraint is the same as the algorithm constraint supported by the network device itself and the network device itself as one network topology.

Figure 3:
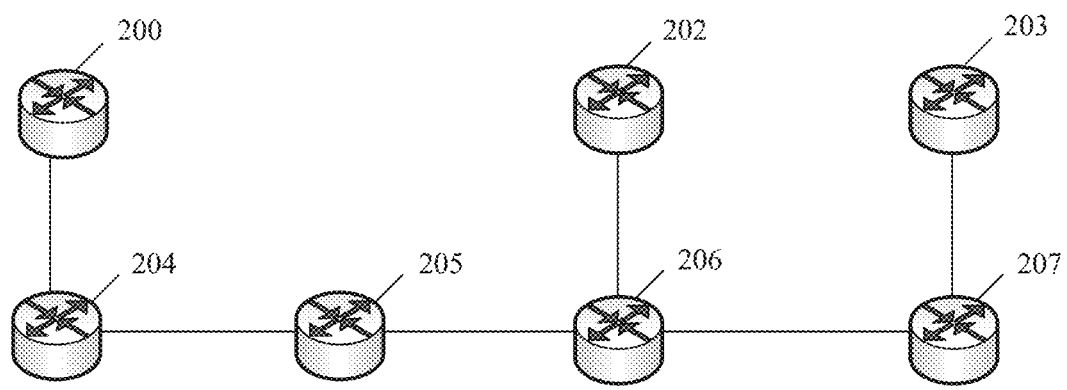
FIG. 3 is a schematic diagram of a network topology 1 according to an embodiment of this application.
Figure 4:
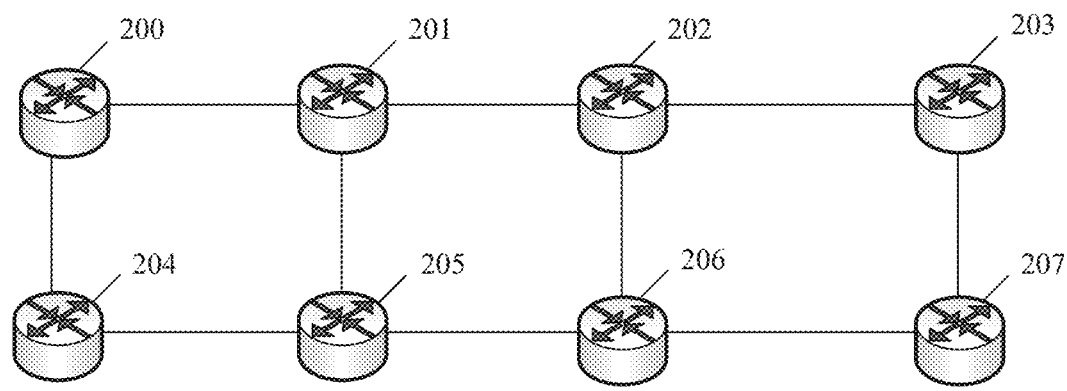
FIG. 4 is a schematic diagram of a network topology 2 according to an embodiment of this application.

For example, a network topology that supports the network slice 1 includes a network device 200, a network device 202, a network device 203, a network device 204, a network device 205, a network device 206, and a network device 207. A network topology that supports the network slice 2 includes a network device 200, a network device 201, a network device 202, a network device 203, a network device 204, a network device 205, a network device 206, and a network device 207. Referring to FIG. 3, network devices that support the network slice 1 form a network topology 1. Referring to FIG. 4, network devices that support the network slice 2 form a network topology 2.

It may be understood that one network device may support one network slice, or may support a plurality of network slices. For example, network devices that support both the network slice 1 and the network slice 2 are the network device 200, the network device 202, the network device 203, the network device 204, the network device 205, the network device 206, and the network device 207.

S102: The network device calculates a forwarding path from the network device itself to the another network device in the network topology based on an algorithm constraint corresponding to the network topology.

In this embodiment of this application, the network device calculates, based on a network topology to which the network device belongs, a forwarding path from the network device itself to another network device in the network topology. The forwarding path may be a path with a minimum link cost, or may be referred to as a shortest forwarding path.

If a specific network device supports a plurality of network slices, corresponding forwarding paths may be respectively calculated for the plurality of network slices. For example, a shortest forwarding path that is from the network device 200 to the network device 203 and that is calculated by the network device 200 for the network topology 1 may be: the network device 200—the network device 204—the network device 205—the network device 206—the network device 207—the network device 203. A shortest forwarding path that is from the network device 200 to the network device 203 and that is calculated by the network device 200 for the network topology 2 may be: the network device 200—the network device 201—the network device 202—the network device 203.

S103: The network device determines, based on the forwarding path, main interface information of a main interface connected to a next-hop network device, and generates a corresponding label forwarding table based on the main interface information.

Optionally, the label forwarding table may include an incoming label, an outgoing label, and outbound interface information, where an outbound interface corresponding to the outbound interface information refers to the main interface. In other words, the outbound interface information included in the label forwarding table is the main interface information, and the main interface information is information about an interface connecting the network device to the next-hop network device on the forwarding path.

If one network device supports a plurality of different network topologies, and a specific main interface of the network device is corresponding to a plurality of forwarding paths, a plurality of pieces of sub-interface information corresponding to the main interface may be obtained, and a corresponding label forwarding table is separately generated for the different forwarding paths based on the plurality of pieces of sub-interface information. The label forwarding table may further include an FA ID and/or a color in the FA algorithm constraint.

In other words, one main interface may include a plurality of sub-interfaces. The sub-interface may be a physical interface or a logical interface. If there is only one physical link between two network devices, an interface corresponding to the link is a main interface, and a sub-interface is a logical interface based on the link. For example, two tunnels can be established based on one physical link, and a tunnel interface of each tunnel is a sub-interface. If there are a plurality of physical links between two network devices, the plurality of physical links may be corresponding to one main interface, and an interface of each physical link may be one sub-interface. The main interface may be a Layer 3 interface in the intermediate system to intermediate system (ISIS) protocol, and the sub-interface may be a Layer 2 interface. The main interface information is information used to identify the main interface, for example, an interface number or an interface index of the main interface. The sub-interface information is information used to identify the sub-interface, for example, an interface number or an interface index of the sub-interface.

In this embodiment of this application, a plurality of sub-interfaces of a same main interface may be configured to forward packets for different network slices, and one sub-interface is corresponding to one network slice, that is, corresponding to one algorithm constraint.

In actual application, the network device may obtain a mapping relationship between the sub-interface information and the algorithm constraint by using the controller 100. Specifically, the network device 200 to the network device 207 each may report main interface information of the network device itself to the controller 100. The controller 100 may create corresponding sub-interface information for the main interface information of the network device, and establish the mapping relationship between the sub-interface information and the FA algorithm constraint, and send the mapping relationship between the sub-interface information and the FA algorithm constraint to the network device.

For example, in FIG. 1, the network device 200 is separately connected to the network device 201 and the network device 204. Information about a main interface that is of the network device 200 and that is used to establish a neighboring relationship with the network device 201 is GE1/0/1, and information about a main interface that is of the network device 200 and that is used to establish a neighboring relationship with the network device 204 is GE1/0/2.

The controller 100 may match two pieces of sub-interface information for the main interface information GE0/i of the network device 200, and the two pieces of sub-interface information are respectively GE1/0/1.1 and GE1/0/1.2. The main interface matching the sub-interface means that the main interface information is corresponding to a plurality of pieces of sub-interfaces. The controller 100 may match two pieces of sub-interface information for the main interface information GE1/0/2 of the network device 200, and the two pieces of sub-interface information are respectively GE1/0/2.1 and GE1/0/2.2. GE1/0/1.1 is corresponding to an FA algorithm constraint whose FA ID is 128, and GE1/0/1.2 is corresponding to an FA algorithm constraint whose FA ID is 129.

Table 1 shows sub-interface information matching main interface information of each network device in the network device 200 to the network device 207 and an FA ID and a color corresponding to the sub-interface information. (Note:

A left blank indicates that sub-interface information can be used to match an FA algorithm constraint other than the FA algorithm constraint whose FA ID 128 or 129)

TABLE 1

| Network device | Neighboring node | Main interface information | Sub-interface information | FA ID | Color |
|---|---|---|---|---|---|
| Network device 200 | Network device 201 | GE1/0/1 | GE1/0/1.1 | | |
| | | | GE1/0/1.2 | 129 | blue |
| | Network device 204 | GE1/0/2 | GE1/0/2.1 | 128 | red |
| | | | GE1/0/2.2 | 129 | blue |
| Network device 201 | Network device 202 | GE2/0/1 | GE2/0/1.1 | | |
| | | | GE2/0/1.2 | 129 | blue |
| | Network device 205 | GE2/0/2 | GE2/0/2.1 | | |
| | | | GE2/0/2.2 | 129 | blue |
| | Network device 200 | GE2/0/3 | GE2/0/3.1 | | |
| | | | GE2/0/3.2 | 129 | blue |
| Network device 202 | Network device 203 | GE3/0/1 | GE3/0/1.1 | | |
| | | | GE3/0/1.2 | 129 | blue |
| | Network device 206 | GE3/0/2 | GE3/0/2.1 | 128 | red |
| | | | GE3/0/2.2 | 129 | blue |
| | Network device 201 | GE3/0/3 | GE3/0/3.1 | | |
| | | | GE3/0/3.2 | 129 | blue |
| Network device 203 | Network device 207 | GE4/0/1 | GE4/0/1.1 | 128 | red |
| | | | GE4/0/1.2 | 129 | blue |
| | Network device 202 | GE4/0/2 | GE4/0/2.1 | | |
| | | | GE4/0/2.2 | 129 | blue |
| Network device 204 | Network device 205 | GE5/0/1 | GE5/0/1.1 | 128 | red |
| | | | GE5/0/1.2 | 129 | blue |
| | Network device 200 | GE5/0/2 | GE5/0/2.1 | 128 | red |
| | | | GE5/0/2.2 | 129 | blue |
| Network device 205 | Network device 206 | GE6/0/1 | GE6/0/1.1 | 128 | red |
| | | | GE6/0/1.2 | 129 | blue |
| | Network device 201 | GE6/0/2 | GE6/0/2.1 | | |
| | | | GE6/0/2.2 | 129 | blue |
| | Network device 204 | GE6/0/3 | GE6/0/3.1 | 128 | red |
| | | | GE6/0/3.2 | 129 | blue |
| Network device 206 | Network device 207 | GE7/0/1 | GE7/0/1.1 | 128 | red |
| | | | GE7/0/1.2 | 129 | blue |
| | Network device 202 | GE7/0/2 | GE7/0/2.1 | 128 | red |
| | | | GE7/0/2.2 | 129 | blue |
| | Network device 205 | GE7/0/3 | GE7/0/3.1 | 128 | red |
| | | | GE7/0/3.2 | 129 | blue |
| Network device 207 | Network device 203 | GE8/0/1 | GE8/0/1.1 | 128 | red |
| | | | GE8/0/1.2 | 129 | blue |
| | Network device 206 | GE8/0/2 | GE8/0/2.1 | 128 | red |
| | | | GE8/0/2.2 | 129 | blue |

The controller 100 may deliver the mapping relationship between the sub-interface information and the FA algorithm constraint to the network device connected to the controller 100, so that the network device performs path calculation. In the foregoing description, the controller 100 may send a plurality of FA algorithm constraints to the network device in a flooding manner. Therefore, when the controller 100 delivers the mapping relationship between the sub-interface information and the FA algorithm constraint, to save network resources, an FA ID and/or a link attribute may be used to represent the FA algorithm constraint, a mapping relationship is established between the FA ID and/or the link attribute and the sub-interface information, and the mapping relationship is delivered to the network device. In other words, the controller may send only a mapping relationship between the sub-interface information and the FA ID, send only a mapping relationship between the sub-interface information and the color, or send a mapping relationship between the sub-interface information and both the FA ID and the color. When different FA IDs are corresponding to different link attributes, the link attribute may be used to represent the FA algorithm constraint to establish a mapping relationship between the link attribute and the sub-interface information. Certainly, the controller 100 may also simultaneously deliver the sub-interface information and all content of the FA algorithm constraint to the network device, instead of separately delivering the sub-interface information and all content of the FA algorithm constraint to the network device twice.

Certainly, it may be understood that the network device may not obtain the mapping relationship between the sub-interface information and the algorithm constraint by using the controller 100, but may obtain the mapping relationship in another manner, for example, configuring the mapping relationship in the network device. This is not specifically limited in this application either.

After the mapping relationship between the sub-interface information and the algorithm constraint is obtained, the FA ID and/or the link attribute in the algorithm constraint may be added to the label forwarding table. In other words, the mapping relationship between the FA ID and/or the link attribute in the algorithm constraint and the main interface information is reflected in the label forwarding table. In this way, corresponding sub-interface information can be determined by searching Table 1 based on the main interface information and the FA ID and/or the link attribute in the algorithm constraint.

For example, in the shortest forwarding path that is from the network device 200 to the network device 203 and that is calculated by the network device 200 for the network topology 1, if a next-hop network device is the network device 204, and in the shortest forwarding path that is from the network device 200 to the network device 203 and that is calculated by the network device 200 for the network topology 2, if a next-hop network device is the network device 201, because the next-hop network devices of the two forwarding paths are different network devices, a main interface that is of the network device 200 and that is connected to the network device 204 is corresponding to only one forwarding path, and similarly, a main interface that is of the network device 200 and that is connected to the network device 204 is also corresponding to only one forwarding path. In this case, the label forwarding table corresponding to the main interface that is of the network device 200 and that is connected to the network device 204 may include or may not include the FA ID and/or the color in the FA algorithm constraint. Likewise, a main interface that is of the network device 200 and that is connected to the network device 201 is also corresponding to only one forwarding path. In this case, the label forwarding table corresponding to the main interface that is of the network device 200 and that is connected to the network device 201 may include or may not include the FA ID and/or the color in the FA algorithm constraint.

In the shortest forwarding path that is from the network device 200 to the network device 203 and that is calculated by the network device 200 for the network topology 2, if a next-hop network device is also the network device 204, in other words, a main interface that is of the network device 200 and that is connected to the network device 204 is corresponding to two forwarding paths, the label forwarding table corresponding to the main interface connected to the network device 201 needs to include the FA ID and/or the color in the FA algorithm constraint, so that the network device 200 can search Table 1 based on the FA ID and/or the color in the FA algorithm constraint in the label forwarding table and main interface information of the main interface, to obtain the corresponding sub-interface information. In other words, the sub-interface information search solution includes three implementations: 1: Search Table 1 based on the FA ID and the main interface information; 2: Search Table 1 based on the color and main interface information; and 3: Search Table 1 based on the FA ID, the color, and the main interface information.

Optionally, if a same main interface is corresponding to different forwarding paths, the same main interface should be corresponding to different incoming labels and different outgoing labels in different label forwarding tables.

To generate the incoming label and the outgoing label, a network device in the network topology may notify, in a flooding manner, another network device of a prefix segment identifier (Prefix SID) corresponding to the network topology. For example, the network device 203 advertises, in a flooding manner to the network device that supports the network slice 1, a prefix SID 100 corresponding to the network topology 1, and advertises, to a network device that supports the network slice 2, a prefix SID 200 corresponding to the network topology 2. After receiving the prefix SID, the network device calculates the incoming label and the outgoing label based on a stored segment routing global block (SRGB) range.

For example, an SRGB range of the network device 200 is [1000, 2000], an SRGB range of the network device 201 is [2000, 3000], an SRGB range of the network device 202 is [3000, 4000], an SRGB range of the network device 203 is [4000, 5000], an SRGB range of the network device 204 is [5000, 6000], an SRGB range of the network device 205 is [6000, 7000], an SRGB range of the network device 206 is [7000, 8000], and an SRGB range of the network device 207 is [8000, 9000].

In this case, an incoming label calculated by the network device 200 for a label forwarding table corresponding to the network slice 1 may be 1100, and an outgoing label calculated by the network device 200 for a label forwarding table corresponding to the network slice 1 may be 2100. An incoming label calculated by the network device 200 for a label forwarding table corresponding to the network slice 2 may be 1200, and an outgoing label calculated by the network device 200 for a label forwarding table corresponding to the network slice 2 may be 2200. By analogy, a label forwarding table generated by the network device for a supported network slice may be obtained.

Referring to Table 2, the following describes, by using the forwarding path of the network device 200—the network device 204—the network device 205—the network device 206—the network device 207—the network device 203 as an example, a label forwarding table that is generated by the network device on the forwarding path and that supports the network slice 1.

TABLE 2

| Network device | Incoming label | Prefix SID | Outgoing label | Outbound interface Information | FA ID | Color |
|---|---|---|---|---|---|---|
| Network device 200 | 1100 | 100 | 5100 | GE1/0/2 | 128 | red |
| Network device 204 | 5100 | 100 | 6100 | GE5/0/1 | 128 | red |
| Network device 205 | 6100 | 100 | 7100 | GE6/0/1 | 128 | red |
| Network device 206 | 7100 | 100 | 8100 | GE7/0/1 | 128 | red |
| Network device 207 | 8100 | 100 | 4100 | GE8/0/1 | 128 | red |

TABLE 2-continued

| Network device | Incoming label | Prefix SID | Outgoing label | Outbound interface Information | FA ID | Color |
|---|---|---|---|---|---|---|
| Network device 203 | 4100 | 100 | | | 128 | red |

After the forwarding path and the corresponding label forwarding table are generated, a packet may be forwarded based on the label forwarding table.

S104: The network device obtains the packet, determines a corresponding label based on the packet, searches a label forwarding table based on the corresponding label to obtain main interface information corresponding to the packet, and forwards the packet based on a main interface corresponding to the main interface information corresponding to the packet.

If the packet obtained by the network device is a packet received by the network device from another network device, and the packet is an internet protocol (IP) packet, a corresponding incoming label may be determined based on a flow identifier carried in the packet, and then a corresponding label forwarding table is found based on the corresponding incoming label. If the packet received by the network device is a multi-protocol label switching (MPLS) packet, a topmost label in a label stack in a header of the packet is used as an incoming label, and then a label forwarding table corresponding to the incoming label is searched. In this embodiment of this application, the flow identifier is an identifier that has an indication function on a flow, for example, a source address or a destination address of the packet, or a label that identifies a service to which the packet belongs.

After the label forwarding table is determined, a corresponding outgoing label and corresponding main interface information are obtained from the label forwarding table, the outgoing label is encapsulated in the packet, and a packet encapsulated with the outgoing label is forwarded through the main interface corresponding to the main interface information.

When the label forwarding table further includes the FA ID and/or the color in the FA algorithm constraint, the FA ID and/or the color in the FA algorithm constraint may further be obtained from the label forwarding table, and then Table 1 is searched based on outbound interface information and the FA ID and/or color in the FA algorithm constraint, to obtain corresponding sub-interface information. The packet encapsulated with the outgoing label is forwarded based on a sub-interface corresponding to the sub-interface information.

The following uses the forwarding path of the network device 200—the network device 204—the network device 205—the network device 206—the network device 207—the network device 203 as an example to describe a process of forwarding the packet by the network device.

The network device 200 receives a packet, where the packet is an IP packet, and searches a corresponding label forwarding table based on a flow identifier in the IP packet, for example, a destination address of the packet, namely, an address of the network device 203. It may be learned according to Table 1 that the network device 200 and the network device 203 support both the network slice 1 and the network slice 2. Therefore, the network device 200 may have two label forwarding tables, and one label forwarding table is a label forwarding table that is in Table 2 and that is corresponding to the network slice 1, and the other label forwarding table is a label forwarding table that is in Table 2 and that is corresponding to the network slice 2. In other words, the label forwarding table corresponding to the destination address of the IP packet includes the label forwarding table corresponding to the network slice 1, and also includes the label forwarding table corresponding to the network slice 2. In this case, further determining may be performed with reference to other information of the IP packet, for example, a source address of the packet.

Specifically, the network device 200 may preset a mapping relationship between the source address and a corresponding network slice. In this way, if a plurality of label forwarding tables are found by using the destination address, a label forwarding table corresponding to the network slice may be found based on the source IP address. For example, the source address of the IP packet is corresponding to the network slice 1, and therefore it is determined that a label forwarding table corresponding to the IP packet is the label forwarding table in Table 2.

The label forwarding table of the network device 200 in Table 2 includes an incoming label 1100, an outgoing label 5100, outbound interface information GE1/0/2, an FA ID 128, and a color red. After receiving the IP packet, the network device 200 may determine, based on the destination address of the IP packet, a label forwarding table that needs to be used, and then push an outgoing label in the label forwarding table into a header of the IP packet to generate an MPLS packet, where a label in the MPLS packet is the outgoing label 5100. In addition, the network device 200 searches Table 1 based on the outbound interface information GE1/0/2 and at least one of the FA ID 128 and the color red, to obtain corresponding sub-interface information GE1/0/2.1, and then forwards, to the network device 204 based on a sub-interface corresponding to the sub-interface information, the MPLS packet that carries the label 5100.

After receiving the MPLS packet, the network device 204 searches a label forwarding table with an incoming label 5100 based on the label 5100 carried in the packet, and obtains an outgoing label 6100, outbound interface information GE5/0/1, an FA ID 128, and a color red. The network device 204 replaces the label 5100 in the MPLS packet with the outgoing label 6100, searches Table 1 based on the outbound interface information GE5/0/1 and at least one of the FA ID 128 and the color red, to obtain corresponding sub-interface information GE5/0/1.1, and then forwards, to the network device 205 based on a sub-interface corresponding to the sub-interface information, the MPLS packet that carries the label 6100.

After receiving the MPLS packet, the network device 205 searches a label forwarding table with an incoming label 6100 based on the label 6100 carried in the packet, and obtains an outgoing label 7100, outbound interface information GE6/0/1, an FA ID 128, and a color red. The network device 205 replaces the label 6100 in the MPLS packet with the outgoing label 7100, searches Table 1 based on the outbound interface information GE6/0/1 and at least one of the FA ID 128 and the color red, to obtain corresponding sub-interface information GE6/0/1.1, and then forwards, to the network device 206 based on a sub-interface corresponding to the sub-interface information, the MPLS packet that carries the label 7100.

After receiving the MPLS packet, the network device 206 searches a label forwarding table with an incoming label 7100 based on the label 7100 carried in the packet, and obtains an outgoing label 8100, outbound interface information GE7/0/1, an FA ID 128, and a color red. The network device 206 replaces the label 7100 in the MPLS packet with the outgoing label 8100, searches Table 1 based on the outbound interface information GE7/0/1 and at least one of the FA ID 128 and the color red, to obtain corresponding sub-interface information GE7/0/1.1, and then forwards, to the network device 207 based on a sub-interface corresponding to the sub-interface information, the MPLS packet that carries the label 8100.

After receiving the MPLS packet, the network device 207 searches a label forwarding table with an incoming label 8100 based on the label 8100 carried in the packet, and obtains an outgoing label 4100, outbound interface information GE8/0/1, an FA ID 128, and a color red. The network device 207 replaces the label 8100 in the MPLS packet with the outgoing label 4100, searches Table 1 based on the outbound interface information GE8/0/1 and at least one of the FA ID 128 and the color red, to obtain corresponding sub-interface information GE8/0.1, and then forwards, to the network device 203 based on a sub-interface corresponding to the sub-interface information, the MPLS packet that carries the label 4100. Alternatively, after receiving the MPLS packet from the network device 206, the network device 207 restores the MPLS packet to the IP packet, and forwards the IP packet to the network device 203 by using a sub-interface corresponding to the sub-interface information GE8/0/1.1.

If a packet received by the network device 203 from the network device 207 is an MPLS packet, and the network device 203 searches the label forwarding table with the incoming label 4100 based on the label 4100 and determines that there is no outgoing label in the label forwarding table, the network device 203 restores the MPLS packet to the IP packet, and the packet forwarding process ends. If a packet sent by the network device 203 from the network device 207 is an IP packet, and the network device 203 determines that a destination address in the IP packet is an address of the network device 203, the packet forwarding process ends.

Application Scenario 2: The controller 100 calculates the forwarding path.

Figure 5A:
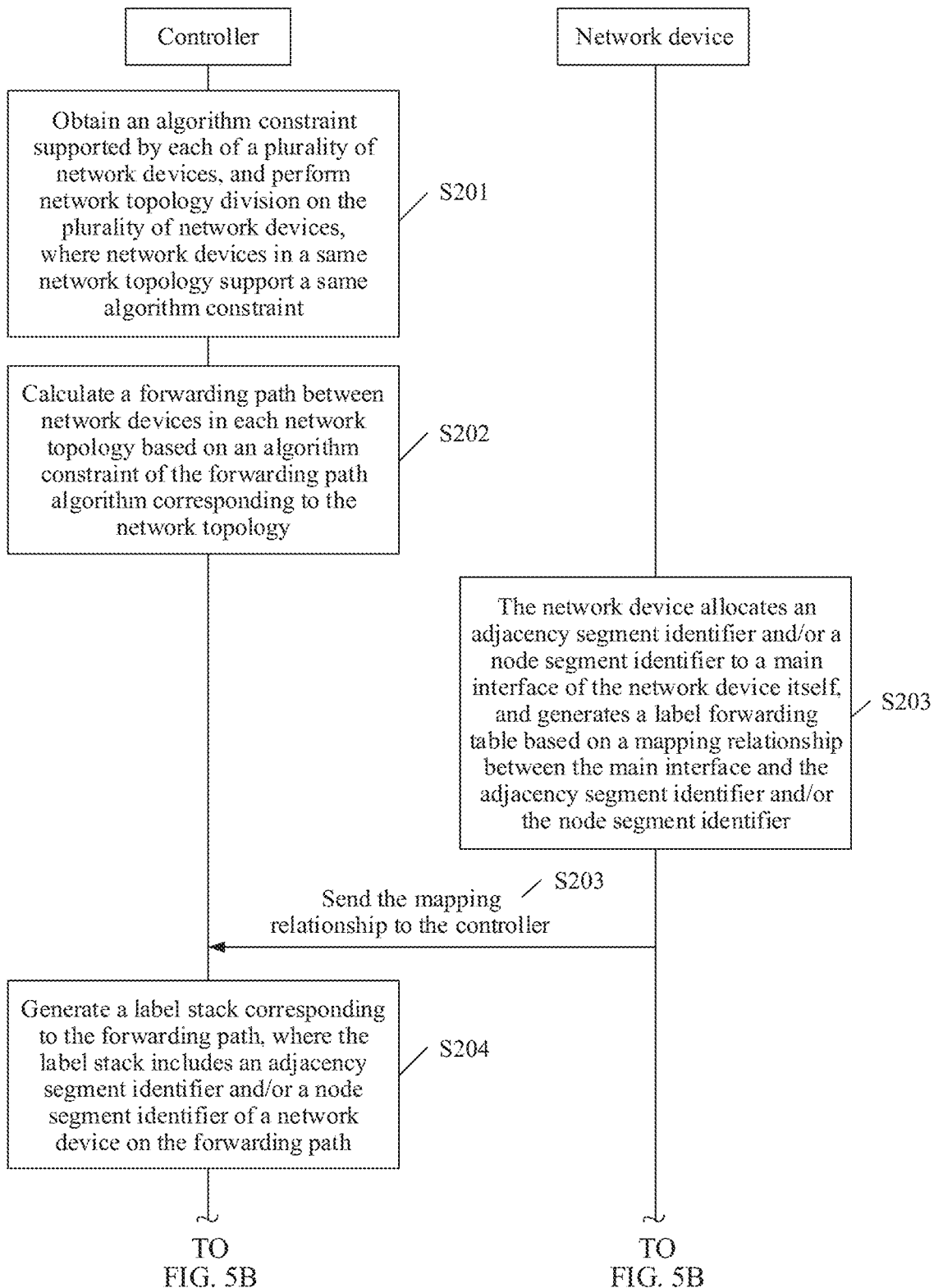
FIG. 5A and FIG. 5B are schematic interaction diagrams of another path calculation method according to an embodiment of this application.
Figure 5B:
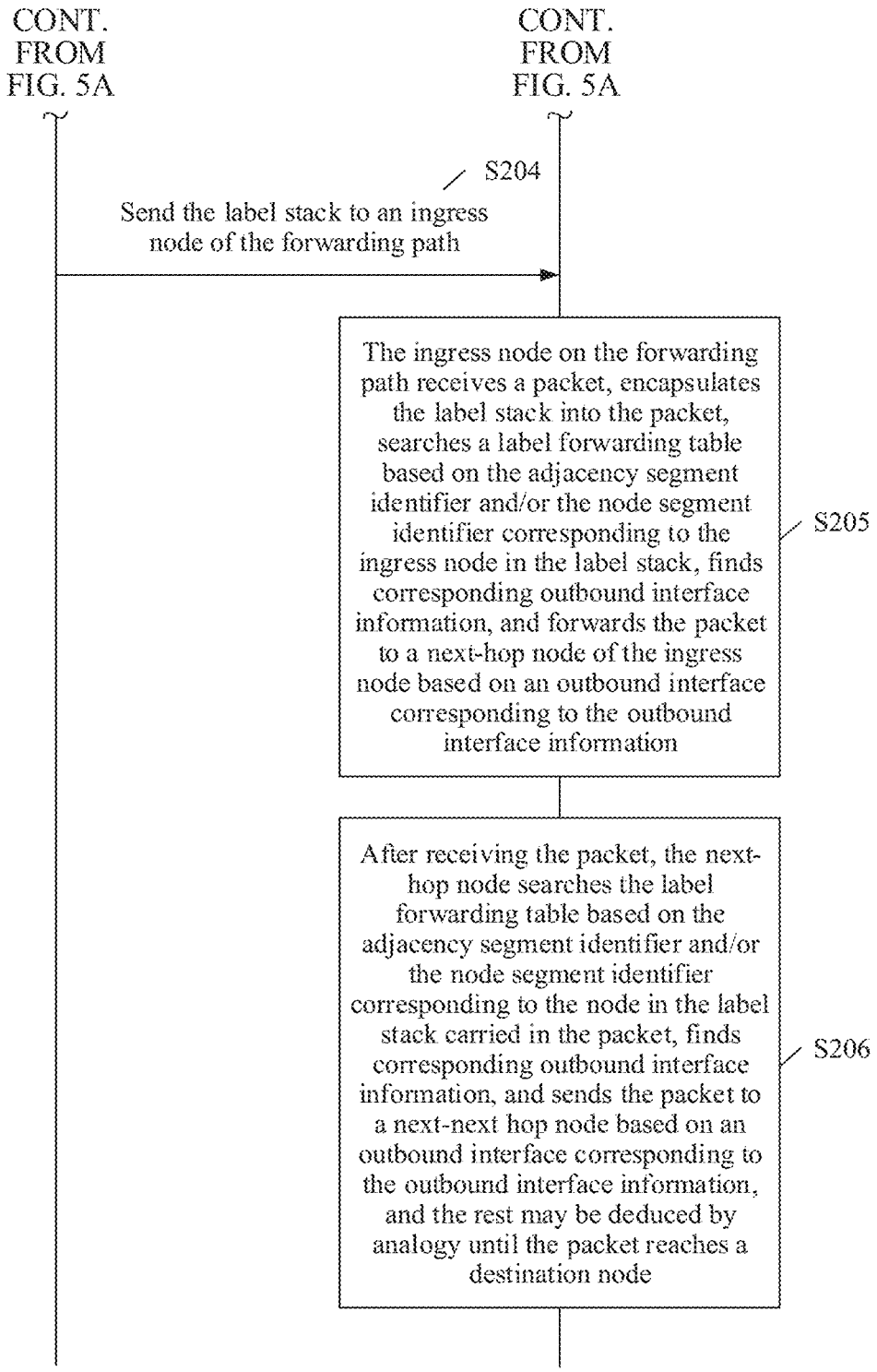

FIG. 5A and FIG. 5B are schematic interaction diagrams of another path calculation method according to an embodiment of this application.

S201: The controller 100 obtains an algorithm constraint supported by each of a plurality of network devices, and performs network topology division on the plurality of network devices, where network devices in a same network topology support a same algorithm constraint.

In this embodiment of this application, each of the plurality of network devices may support only one of the plurality of algorithm constraints, or at least one network device may support at least two different algorithm constraints.

Specifically, the controller 100 may obtain, in a creation manner, algorithm constraints supported by the plurality of network devices. For example, the controller 100 creates an FA algorithm constraint corresponding to the network slice 1 and an FA algorithm constraint corresponding to the network slice 2. For the FA algorithm constraint corresponding to the network slice 1 and the FA algorithm constraint corresponding to the network slice 2, refer to the foregoing description. Details are described herein again.

After obtaining the algorithm constraints supported by the plurality of network devices, the controller 100 may perform network topology division on the plurality of network devices, and divide network devices that support a same algorithm constraint into one network topology. For example, a network topology that supports the algorithm constraint corresponding to the network slice 1 includes a network device 200, a network device 202, a network device 203, a network device 204, a network device 205, a network device 206, and a network device 207. A network topology that supports the algorithm constraint corresponding to the network slice 2 includes a network device 200, a network device 201, a network device 202, a network device 203, a network device 204, a network device 205, a network device 206, and a network device 207.

S202: The controller 100 calculates a forwarding path between network devices in each network topology based on the algorithm constraint, of the forwarding path algorithm, corresponding to the network topology.

After the network topology is obtained, the controller 100 calculates the forwarding path between the network devices in each network topology based on the algorithm constraint, of the forwarding path algorithm, corresponding to the network topology. For related descriptions of the forwarding path, refer to the foregoing description. Details are not described herein again.

The following describes a step of triggering the controller 100 to generate the forwarding path. The controller 100 receives a request message for establishing a packet path from an ingress node, where the request message includes a flow identifier of a packet. Then, the controller 100 determines a network topology for forwarding the packet based on the flow identifier, and calculates a forwarding path for forwarding the packet in the network topology. For descriptions of the flow identifier, refer to the foregoing description. Details are not described herein again.

In this embodiment of this application, an object for calculating the forwarding path is the controller 100. Therefore, the network device needs to send the request message including the flow identifier to the controller 100, so that the controller 100 can determine a corresponding network topology based on the flow identifier, to calculate the packet forwarding path for the packet.

In this embodiment of this application, the controller 100 may determine, based on the flow identifier in the request message, which network slice is used to forward the packet, and further determine a network topology for forwarding the packet. After determining the network topology for forwarding the packet, the controller 100 calculates a forwarding path of the packet based on the network topology.

For example, it is assumed that the network slice 2 is used to forward the packet is determined based on the flow identifier in the request message. Because a network topology corresponding to the network slice 2 includes a network device 200, a network device 201, a network device 202, a network device 203, a network device 204, a network device 205, a network device 206, and a network device 207, the forwarding path of the packet is calculated based on the network topology.

S203: The network device allocates an adjacency segment identifier (adj SID) and/or a node segment identifier (node segment identifier, node SID) to a main interface of the network device itself, generates a label forwarding table based on a mapping relationship between the main interface and the adjacency segment identifier and/or the node segment identifier, and sends the mapping relationship to the controller 100.

The adjacency segment identifier may also be referred to as an adjacent label.

Optionally, an SR network applied in this embodiment of this application implements TE, and the label forwarding table includes the adjacency segment identifier and/or the node segment identifier, and further includes outbound interface information. An outbound interface corresponding to the outbound interface information herein is the main interface.

Optionally, if one network device supports a plurality of algorithm constraints, the network device may allocate one adjacency segment identifier and/or one node segment identifier to each sub-interface of the main interface. Adjacency segment identifiers and/or node segment identifiers allocated to different sub-interfaces are different. For example, the network device 200 allocates an adjacency segment identifier 1001 to a sub-interface corresponding to sub-interface information GE1/0/2.1, and allocates an adjacency segment identifier 1002 to a sub-interface corresponding to sub-interface information GE1/0/2.2. In addition, the network device may send a mapping relationship between the adjacency segment identifier and the FA ID and/or the color in the FA algorithm constraint to the controller 100. In other words, the adjacency segment identifier and the FA ID may be sent to the controller 100, or the adjacency segment identifier and the color may be sent to the controller 100, or the adjacency segment identifier, the FA ID, and the color may be sent to the controller 100. Likewise, the network device may send a mapping relationship between the node segment identifier and the FA ID and/or the color in the FA algorithm constraint to the controller 100. In other words, the node segment identifier and the FA ID may be sent to the controller 100, or the node segment identifier and the color may be sent to the controller 100, or the node segment identifier, the FA ID, and the color may be sent to the controller 100.

Correspondingly, in addition to the adjacency segment identifier and/or the node segment identifier, and the outbound interface information, the label forwarding table may further include the FA ID and/or the color in the FA algorithm constraint. The FA ID and/or the color in the FA algorithm constraint are/is used to search Table 1 with reference to the outbound interface information to obtain corresponding sub-interface information. A reason is the same as that mentioned in the foregoing embodiment, and details are not described herein again.

Table 3 is a label forwarding table of some network devices.

TABLE 3

| Network device | Neighboring node | Adjacency segment identifier | Outbound interface information | FA ID | Color |
|---|---|---|---|---|---|
| Network device 200 | Network device 201 | 1001 | GE1/0/1 | | |
| | | 1002 | GE1/0/1 | 129 | blue |
| | Network device 204 | 1003 | GE1/0/2 | | |
| | | 1004 | GE1/0/2 | 128 | red |
| Network device 201 | Network device 202 | 2001 | GE2/0/1 | 129 | blue |
| | | 2002 | GE2/0/1 | 129 | blue |
| | Network device 205 | 2003 | GE2/0/2 | | |
| | | 2004 | GE2/0/2 | 129 | blue |
| Network device 202 | Network device 203 | 3001 | GE3/0/1 | | |
| | | 3002 | GE3/0/1 | 129 | blue |
| | Network device 206 | 3003 | GE3/0/2 | 128 | red |
| | | 3004 | GE3/0/2 | 129 | blue |

In actual application, the network device may obtain a mapping relationship between the sub-interface information and the algorithm constraint by using the controller 100. Specifically, the controller 100 may obtain main interface information of the network device, create corresponding sub-interface information for the main interface information of the network device, establish the mapping relationship between the sub-interface information and the FA algorithm constraint, and send the mapping relationship between the sub-interface information and the FA algorithm constraint to the network device.

Certainly, the network device may alternatively obtain the mapping relationship between the sub-interface information and the algorithm constraint in another manner, for example, in a manner of configuration in the network device. This is not specifically limited in this embodiment of this application.

S204: The controller 100 generates a label stack corresponding to the forwarding path, where the label stack includes an adjacency segment identifier of a network device on the forwarding path, and sends the label stack to an ingress node of the forwarding path, to indicate a packet to be forwarded in a corresponding network topology.

Optionally, the label stack is a list including the adjacency segment identifier and/or a node segment identifier of the network device on the forwarding path, and a sequence of adjacency segment identifiers and/or node segment identifiers in the list may reflect a sequence of packets forwarded by the network device.

For example, for a forwarding path, of the network device 200—the network device 201—the network device 202—the network device 203, that satisfies the network slice 2 and that is calculated by the controller 100, referring to Table 4 and Table 4 shows adjacency segment identifiers corresponding to information about sub-interfaces that are of the foregoing four network devices and that are corresponding to the network slice 2.

TABLE 4

| Network device | Neighboring node | Sub-interface information | Adjacency segment identifier |
|---|---|---|---|
| Network device 200 | Network device 201 | GE1/0/1.2 | 1002 |
| Network device 201 | Network device 202 | GE2/0/1.2 | 2002 |
| Network device 202 | Network device 203 | GE3/0/1.2 | 3002 |

Therefore, a label stack formed by the adjacency segment identifiers of the foregoing network devices is {1002, 2002, 3002}. The controller 100 delivers the label stack to the ingress node of the forwarding path, namely, the network device 200.

In this embodiment of this application, the ingress node is a network device that receives the packet or generates the packet.

Certainly, it may be understood that Table 4 is generated on a premise that the mapping relationship between the sub-interface information and the adjacency segment identifier is established in S203. If the established mapping relationship is the mapping relationship between the adjacency segment identifier and the main interface information, the sub-interface information in Table 4 may be replaced with the main interface information.

S205: The ingress node on the forwarding path receives the packet, encapsulates the label stack into the packet, and searches a label forwarding table based on the adjacency segment identifier and/or the node segment identifier corresponding to the ingress node in the label stack, finds corresponding outbound interface information, and forwards the packet to a next-hop node of the ingress node based on an outbound interface corresponding to the outbound interface information.

Optionally, if the label forwarding table further includes the FA ID and/or the color, the outbound interface information and a corresponding FA ID and/or a corresponding color may be obtained based on the adjacency segment identifier and/or the node segment identifier. Table 1 is searched to obtain corresponding sub-interface information. Then, the packet is sent to the next-hop node based on a sub-interface corresponding to the sub-interface information.

The forwarding path of the network device 200—the network device 201—the network device 202—the network device 203 is used as an example. After receiving the packet, the network device 200 encapsulates the label stack {1002, 2002, 3002} into the packet, and searches, based on an adjacency segment identifier corresponding to the network device 200, namely, a topmost label 1002 in the label stack, the label forwarding table to obtain outbound interface information GE1/0/1, an FA ID 129, and a color blue.

Then, the network device 200 searches Table 1 based on the outbound interface information GE1/0/1 and at least one of the FA ID 129 and the color blue to obtain corresponding sub-interface information GE1/0/1.2. After popping an adjacency segment identifier 1002 in the label stack {1002, 2002, 3002}, the network device 200 sends the packet to a next-hop network device, namely, the network device 201, by using a sub-interface corresponding to the sub-interface information GE1/0/1.2.

S206: After receiving the packet, the next-hop node searches the label forwarding table based on the adjacency segment identifier and/or the node segment identifier corresponding to the node in the label stack carried in the packet, finds corresponding outbound interface information, and sends the packet to a next-next hop node based on an outbound interface corresponding to the outbound interface information, and the rest may be deduced by analogy until the packet reaches a destination node.

If the label forwarding table further includes the FA ID and/or the color, the next-hop node may search Table 1 based on the outbound interface information and the FA ID and/or the color in the label forwarding table, to obtain corresponding sub-interface information, sends the packet a next-next hop node based on a sub-interface corresponding to the sub-interface information, and the rest may be deduced by analogy until the packet reaches a destination node.

For example, after receiving a packet that carries a label stack {2002, 3003}, the network device 201 searches the label forwarding table based on an adjacency segment identifier corresponding to the network device 201, namely, a topmost label 2002 in the label stack, to obtain outbound interface information GE2/0/1, an FA ID 129, and a color blue. Then, the network device 201 searches Table 1 based on the outbound interface information GE2/0/1 and at least one of the FA ID 129 and the color blue, to obtain corresponding sub-interface information GE2/0/1.2. After popping an adjacency segment identifier 2002 in the label stack {2002, 3002}, the network device 201 sends the packet to a next-hop network device, namely, the network device 202, by using a sub-interface corresponding to the sub-interface information GE2/0/1.2.

After receiving a packet that carries a label stack {3002}, the network device 202 searches the label forwarding table based on an adjacency segment identifier corresponding to the network device 202, namely, a topmost label 3002 in the label stack, to obtain outbound interface information GE3/0/1, an FA ID 129, and a color blue. Then, the network device 201 searches Table 1 based on the outbound interface information GE3/0/1 and at least one of the FA ID 129 and the color blue, to obtain corresponding sub-interface information GE3/0/1.2.

Because the label stack has only one adjacency segment identifier, after the network device 202 pops out an adjacency segment identifier 3002 in the label stack {3003}, there is no label stack in the packet. The network device 202 sends the packet in which no label stack exists to a next-hop network device, namely, the network device 203, by using a sub-interface corresponding to the sub-interface information GE3/0/1.2.

It should be noted that a function of the controller 100 in the solution in which the controller 100 calculates the forwarding path may also be performed by the ingress node. When the step is performed by the ingress node, the foregoing step of sending, by the controller 100, the label stack to the ingress node is not performed.

Figure 6:
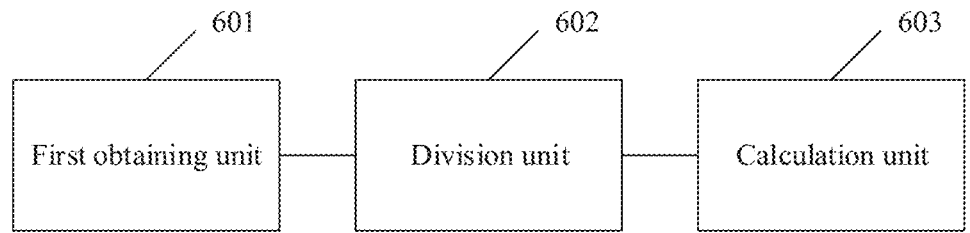
FIG. 6 is a schematic structural diagram of a path calculation apparatus according to an embodiment of this application.

Correspondingly, referring to FIG. 6, an embodiment of this application further provides a path calculation apparatus. The apparatus may be applied to a controller or a network device, and the controller or the network device may implement a function of the controller 100 shown in FIG. 5A and FIG. 5B. The apparatus includes: a first obtaining unit 601, a division unit 602, and a calculation unit 603. The first obtaining unit 601 and the division unit 602 are configured to perform S201 in the embodiment shown in FIG. 2. The calculation unit 603 is configured to perform S202 in the embodiment shown in FIG. 5A and FIG. 5B.

The first obtaining unit 601 is configured to obtain an algorithm constraint supported by each of a plurality of network devices, where the algorithm constraint is a constraint of a forwarding path algorithm, and the forwarding path algorithm is used to calculate, for the network device, a forwarding path that meets the algorithm constraint.

The division unit 602 is configured to perform network topology division on the plurality of network devices, where network devices in a same network topology support a same algorithm constraint.

The calculation unit 603 is configured to calculate a forwarding path between network devices in each network topology based on the algorithm constraint, of the forwarding path algorithm, corresponding to the network topology.

The path calculation apparatus can implement functions of the corresponding controller 100 in the foregoing method embodiment. For specific execution steps, refer to the foregoing method embodiment. Details are not described herein again.

Figure 7:
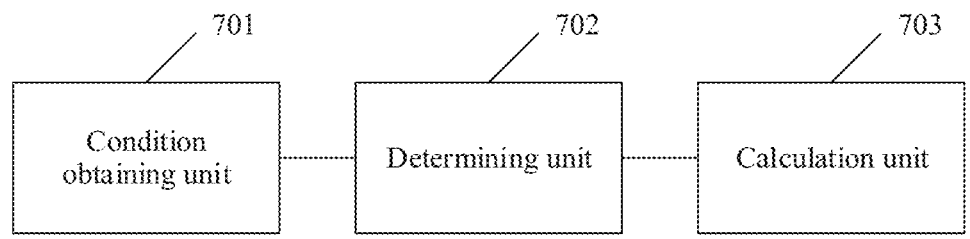
FIG. 7 is a schematic structural diagram of another path calculation apparatus according to an embodiment of this application.

Correspondingly, referring to FIG. 7, an embodiment of this application further provides a path calculation apparatus. The apparatus may be applied to a first network device, for example, the network device 200 to the network device 207 in the embodiment shown in FIG. 2. The apparatus includes: a condition obtaining unit 701, a determining unit 702, and a calculation unit 703. The condition obtaining unit 701 and the determining unit 702 are configured to perform Sioi in the embodiment shown in FIG. 2, and the calculation unit 703 is configured to perform S102 in the embodiment shown in FIG. 2.

Specifically, the condition obtaining unit 701 is configured to obtain an algorithm constraint supported by the first network device, where the algorithm constraint is a constraint of a forwarding path algorithm, and the forwarding path algorithm is used to calculate, for the first network device, a forwarding path that meets the algorithm constraint.

The determining unit 702 is configured to determine a second network device whose algorithm constraint is the same as the algorithm constraint of the first network device, and determine that the first network device and the second network device that support the same algorithm constraint are in one network topology.

The calculation unit 703 is configured to calculate a forwarding path from the first network device to the second network device in the network topology based on an algorithm constraint corresponding to the network topology.

The path calculation apparatus can implement functions of the corresponding network device 200 to the network device 207 in the foregoing method embodiment. For specific execution steps, refer to the foregoing method embodiment. Details are not described herein again.

Figure 8:
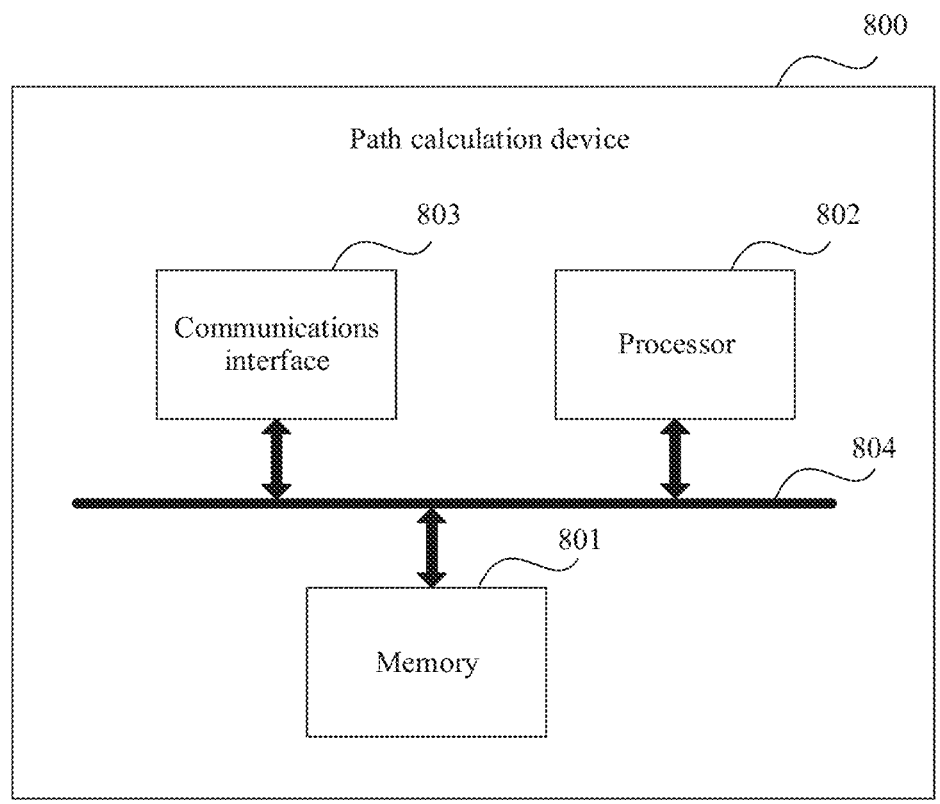
FIG. 8 is a schematic structural diagram of a path calculation device according to an embodiment of this application.

Referring to FIG. 8, an embodiment of this application provides a path calculation device 800. The device may be a controller or a network device. The device 800 may implement functions of the controller in the embodiment shown in FIG. 5A and FIG. 5B. The device includes a memory 801, a processor 802, and a communications interface 803.

The memory 801 is configured to store an instruction.

The processor 802 is configured to execute the instruction in the memory 801, to perform the foregoing path calculation method that is applied to the controller in the embodiment shown in FIG. 5A and FIG. 5B.

The communications interface 803 is configured to communicate with a plurality of network devices.

The memory 801, the processor 802, and the communications interface 803 are connected to each other by using a bus 804. The bus 804 may be a peripheral component interconnect (PCI) bus, an extended industry standard architecture (EISA for short) bus, or the like. The bus may be classified into an address bus, a data bus, a control bus, and the like. For ease of representation, only one thick line is used to represent the bus in FIG. 8, but this does not mean that there is only one bus or only one type of bus.

Figure 9:
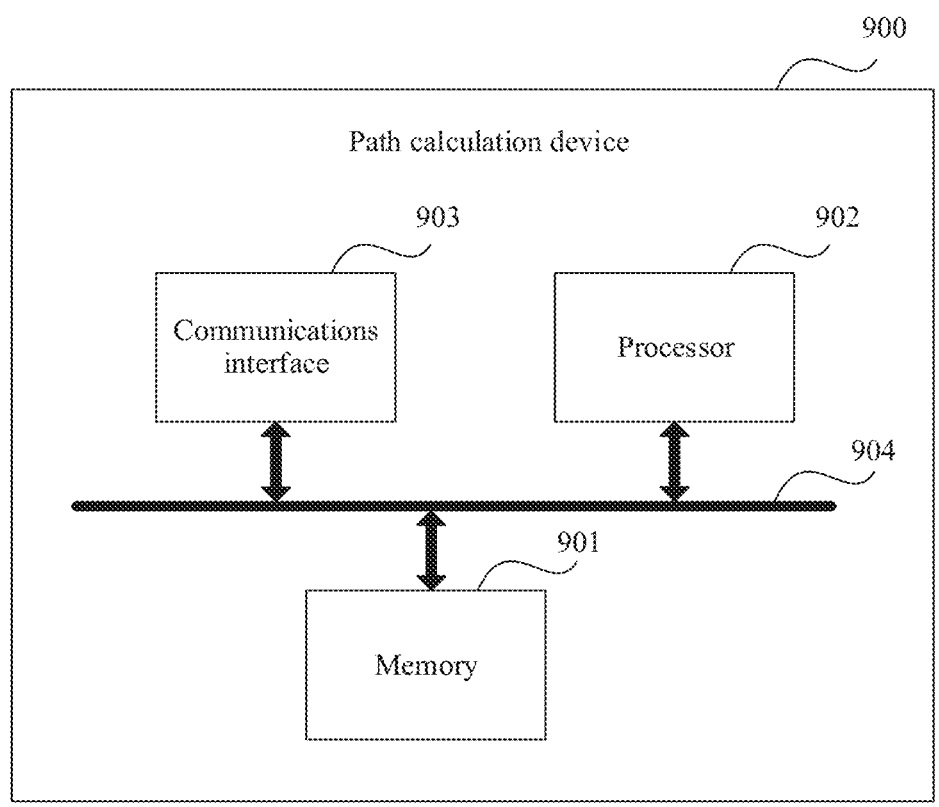
FIG. 9 is a schematic structural diagram of another path calculation device according to an embodiment of this application.

Referring to FIG. 9, an embodiment of this application provides a path calculation device 900. The device is a network device. The device 900 may implement functions of the network device 200 to the network device 207 in the embodiment shown in FIG. 2. The device includes a memory 901, a processor 902, and a communications interface 903.

The memory 901 is configured to store an instruction.

The processor 902 is configured to execute the instruction in the memory 901, to perform the foregoing path calculation method that is applied to the network device in the embodiment shown in FIG. 2.

The communications interface 903 is configured to communicate with a plurality of network devices.

The memory 901, the processor 902, and the communications interface 903 are connected to each other by using a bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The memory 801 and the memory 901 may be a random-access memory (RAM), a flash memory (flash), a read-only memory (ROM), an erasable programmable read-only memory (EPROM), an electrically erasable programmable read-only memory (EEPROM), a register (register), a hard disk, a removable hard disk, a CD-ROM, or any other form of storage medium known to persons skilled in the art.

The processor 802 and the processor 902 may be, for example, a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a calculating function, for example, a combination of one or more microprocessors, or a combination of the DSP and a microprocessor.

The communications interface 803 and the communications interface 903 may be, for example, an interface card, and may be an Ethernet interface or asynchronous transfer mode (ATM) interface.

An embodiment of this application further provides a computer-readable storage medium, including an instruction. When the instruction is run on a computer, the computer is enabled to perform the foregoing path calculation method applied to the controller or the network device.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, services described in the present disclosure may be implemented by hardware, software, firmware, or any combination thereof. When the present disclosure is implemented by software, the foregoing services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method comprising:
   obtaining an algorithm constraint supported by each of a plurality of network devices, wherein the algorithm constraint is a constraint of a forwarding path algorithm, wherein the algorithm constraint comprises a flexible algorithm (Flex Algo);
   performing network topology division on the plurality of network devices to form a network topology, wherein network devices in a same network topology support a same Flex Algo, wherein each network device in the network topology has a sub-interface corresponding to the same Flex Algo; and
   calculating a forwarding path between network devices in one network topology based on the same Flex Algo supported by the network devices in the one network topology.

2. The method according to claim 1, wherein the method further comprises:
receiving a request message for establishing a packet path from an ingress node, wherein the request message comprises a flow identifier of a packet;
determining, based on the flow identifier, the network topology for forwarding the packet using a forwarding path of the network topology;
generating a label stack corresponding to the forwarding path, wherein the label stack comprises an adjacency segment identifier and/or a node segment identifier of a network device on the forwarding path; and
sending the label stack to the ingress node.

3. The method according to claim 1, wherein the algorithm constraint comprises an identifier of the Flex Algo and/or a link attribute comprised in the forwarding path algorithm.

4. The method according to claim 1, wherein the method further comprises:
establishing, a first mapping relationship for each sub-interface corresponding to the same Flex Algo, wherein the first mapping relationship comprises a sub-interface information and the same Flex Algo or a sub-interface information and a color corresponding to the same Flex Algo; and
sending, to the plurality of network devices, the first mapping relationship, wherein the first mapping relationship is used by the corresponding network device to forward a packet.

5. The method according to claim 1, wherein the sub-interface has a color as link attribute, and the Flex Algo has the color as a constraint.

6. A method applied to a first network device, comprising:
obtaining a first algorithm constraint supported by the first network device, wherein the first algorithm constraint is a constraint of a forwarding path algorithm, wherein the first algorithm constraint comprises a flexible algorithm (Flex Ago);
determining a second network device supporting a same Flex Algo as the Flex Algo supported by the first network device, and determining that the first network device and the second network device that support the same Flex Algo belong to one network topology, wherein the first network device has a first sub-interface corresponding to the Flex Algo, the second network device has a second sub-interface corresponding to the Flex Algo, wherein the first sub-interface and the second sub-interface belong to the network topology; and
calculating a first forwarding path from the first network device to the second network device in the one network topology based on the Flex Algo supported by the first network device and the second network device, wherein the first forwarding path comprises the first network device and the second network device.

7. The method according to claim 6, wherein the first algorithm constraint comprises an identifier of the forwarding path algorithm and/or a link attribute comprised in the forwarding path algorithm.

8. The method according to claim 6, wherein the method further comprises:
obtaining a forwarding entry for the first network device, wherein the forwarding entry comprises a segment identifier (SID) and the first sub-interface;
obtaining a packet, determining the forwarding entry based on the packet; and
forwarding the packet by the first sub-interface in the forwarding entry.

9. The method according to claim 6, wherein the first sub-interface has a color as link attribute, the second sub-interface has the color as link attribute, and the Flex Algo has the color as a constraint.

10. An apparatus comprising:
a non-transitory memory storage comprising instructions; and
one or more processors in communication with the memory storage, wherein the instructions, when executed by the one or more processors, cause the apparatus to:
obtain an algorithm constraint supported by each of a plurality of network devices, wherein the algorithm constraint is a constraint of a forwarding path algorithm, wherein the algorithm constraint comprises a flexible algorithm (Flex Algo);
perform network topology division on the plurality of network devices to form network topology, wherein network devices in a same network topology support a same Flex Algo, wherein each network device in the network topology has a sub-interface corresponding to the same Flex Algo; and
calculate a forwarding path between network devices in one network topology based on the same Flex Algo.

11. The apparatus according to claim 10, wherein the algorithm constraint comprises an identifier of the forwarding path algorithm and/or a link attribute comprised in the forwarding path algorithm.

12. The apparatus according to claim 10, wherein the instructions, when executed by the one or more processors, cause the apparatus further to:
establish, a first mapping relationship for each sub-interface corresponding to the same Flex Algo, wherein the first mapping relationship comprises a sub-interface information and the same Flex Algo or a sub-interface information and a color corresponding to the same Flex Algo; and
send, to the plurality of network devices, the first mapping relationship, wherein the first mapping relationship is used by the corresponding network device to forward a packet.

13. The apparatus according to claim 10, wherein the sub-interface has a color as link attribute, and the Flex Algo has the color as a constraint.

14. An apparatus, wherein the apparatus is applied to a first network device, and the apparatus comprises:
a non-transitory memory storage comprising instructions; and
one or more processors in communication with the memory storage, wherein the instructions, when executed by the one or more processors, cause the apparatus to:
obtain a first algorithm constraint supported by the first network device, wherein the first algorithm constraint is a constraint of a forwarding path algorithm, wherein the first algorithm constraint comprises a flexible algorithm (Flex Algo);
determine a second network device supporting a same FlexAlgo as the Flex Algo supported by the first network device, and determine that the first network device and the second network device that support the same Flex Algo are in one network topology, wherein the first network device has a first sub-interface corresponding to the Flex Algo, the second network device has a second sub-interface corresponding to the Flex Algo, wherein the first sub-interfaces and the second sub-interfaces belong to the network topology; and calculate a first forwarding path from the first network device to the second network device in the one network topology based on the Flex Algo supported by the first network device and the second network device, wherein the first forwarding path comprises the first network device and the second network device.

15. The apparatus according to claim 14, wherein first the algorithm constraint comprises an identifier of the Flex Algo and/or a link attribute comprised in the forwarding path algorithm.

16. The apparatus according to claim 14, wherein the instructions, when executed by the one or more processors, cause the apparatus further to:
obtain a forwarding entry for the first network device, wherein the forwarding entry comprises a segment identifier (SID) and the first sub-interface;
obtain a packet, determining the forwarding entry based on the packet; and
forward the packet by the first sub-interface in the forwarding entry.

17. The apparatus according to claim 14, wherein the first sub-interface has a color as link attribute, the second sub-interface has the color as link attribute, and the Flex Algo has the color as a constraint.

* * * * *